June 26, 1928.

J. R. PEIRCE 1,674,660

SORTING MACHINE

Filed April 17, 1922

INVENTOR.
John Royden Peirce
BY
Cooper, Kerr & Dunham.
ATTORNEYS.

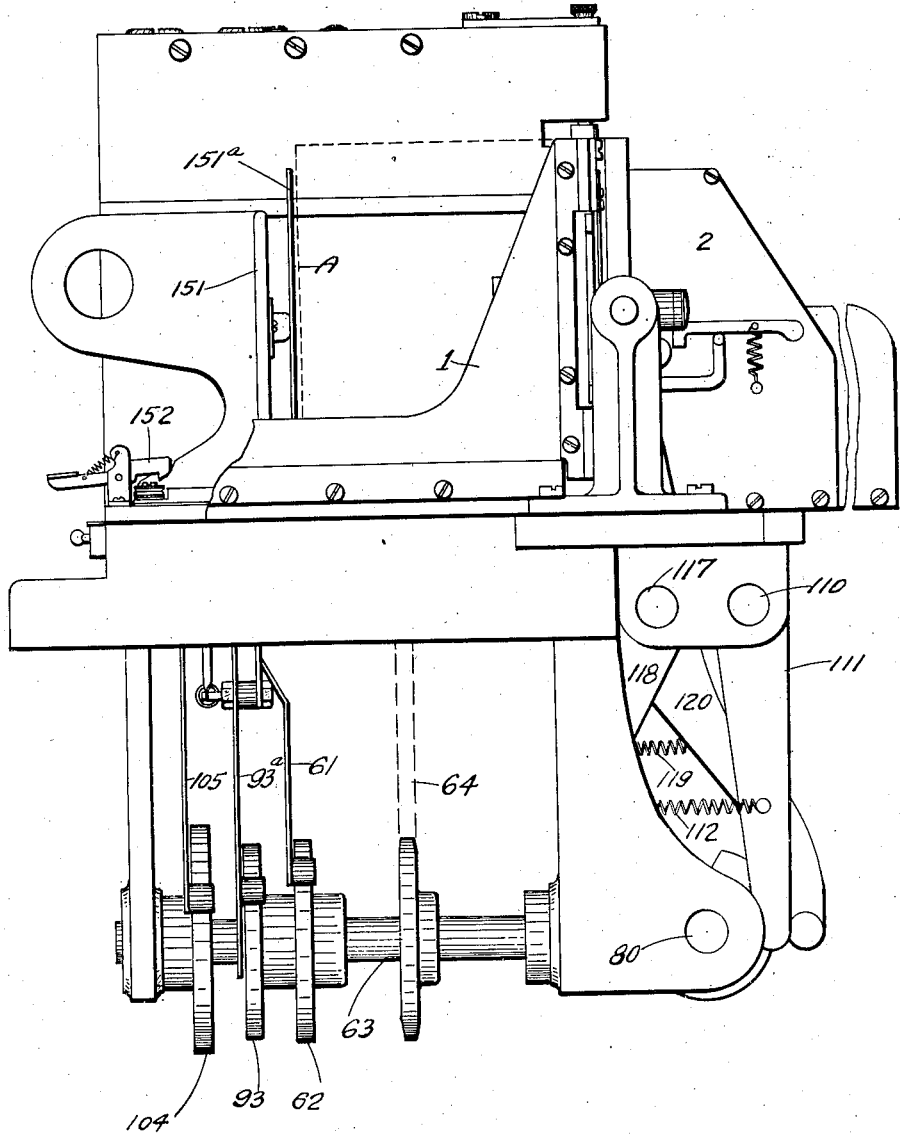

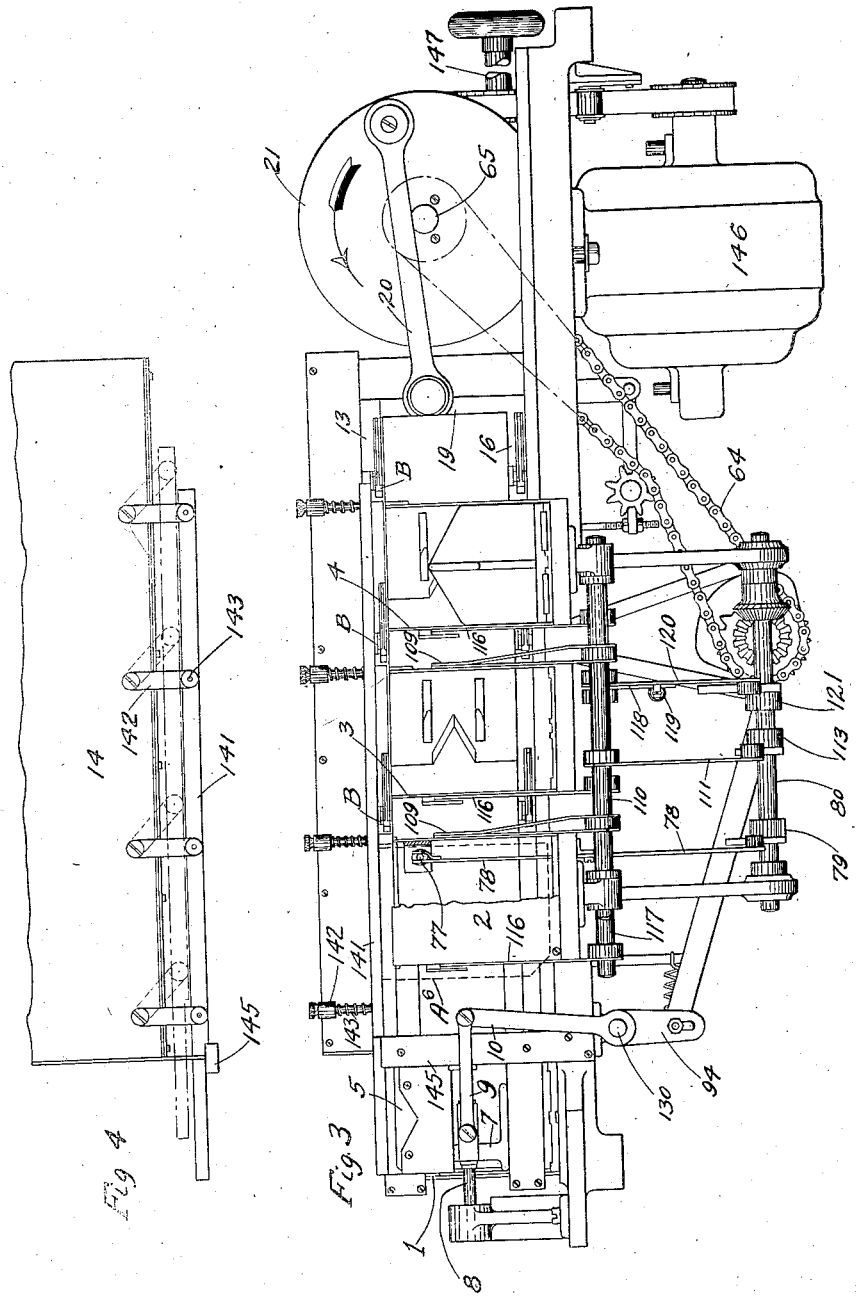

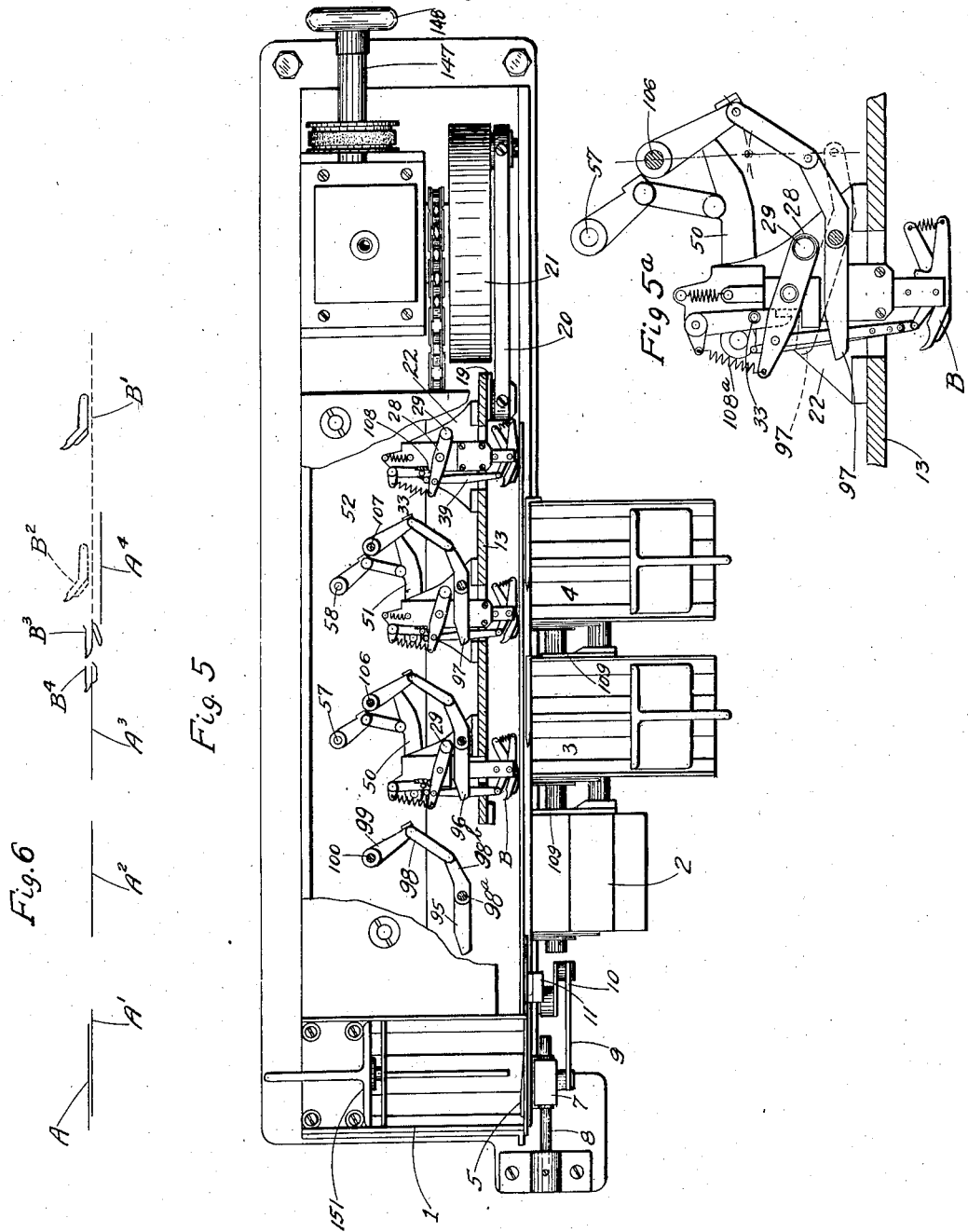

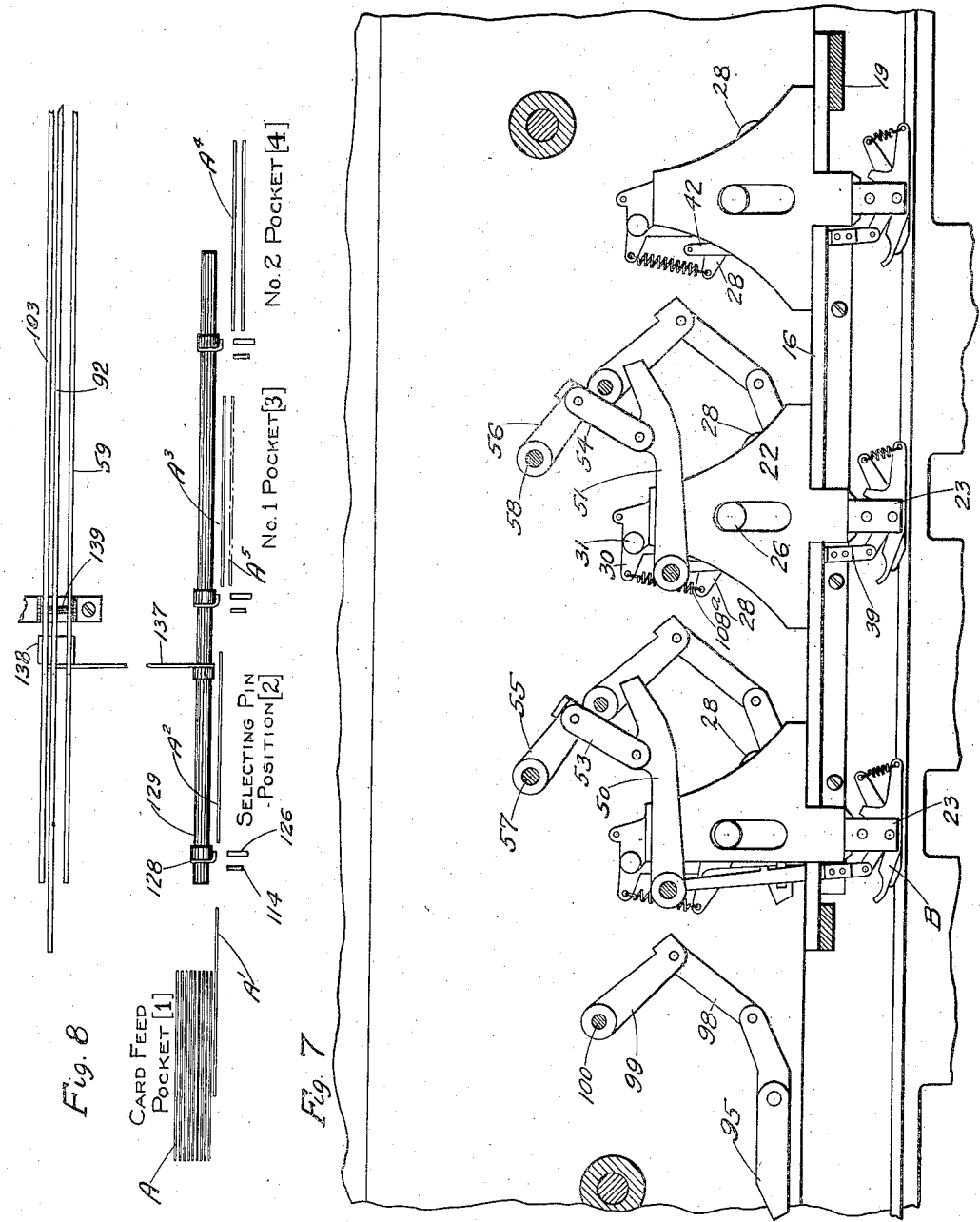

June 26, 1928.  1,674,660
J. R. PEIRCE
SORTING MACHINE
Filed April 17, 1922   13 Sheets-Sheet 6
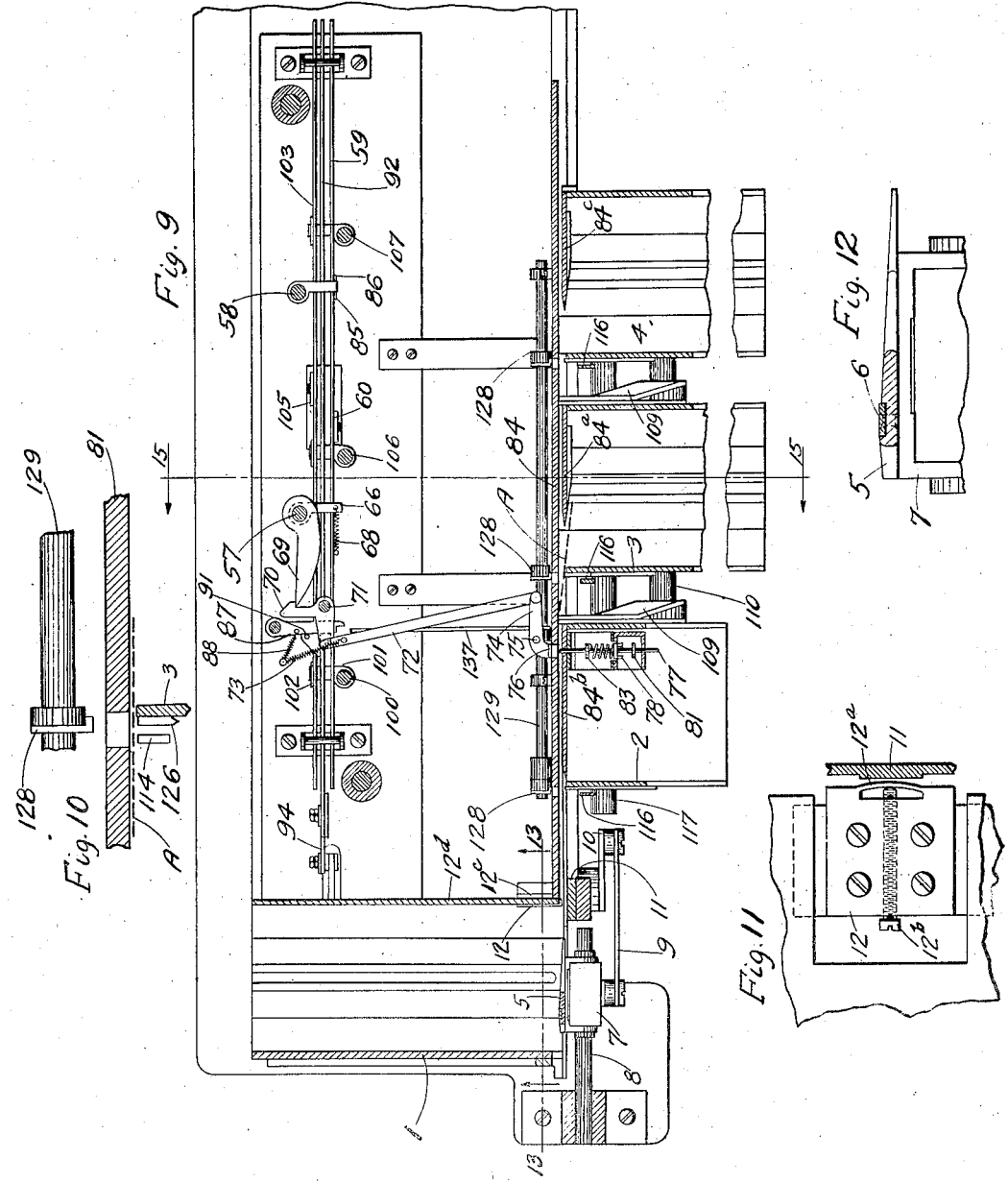
INVENTOR.
John Royden Peirce
BY
Cooper, Kerr & Dunham
ATTORNEYS.

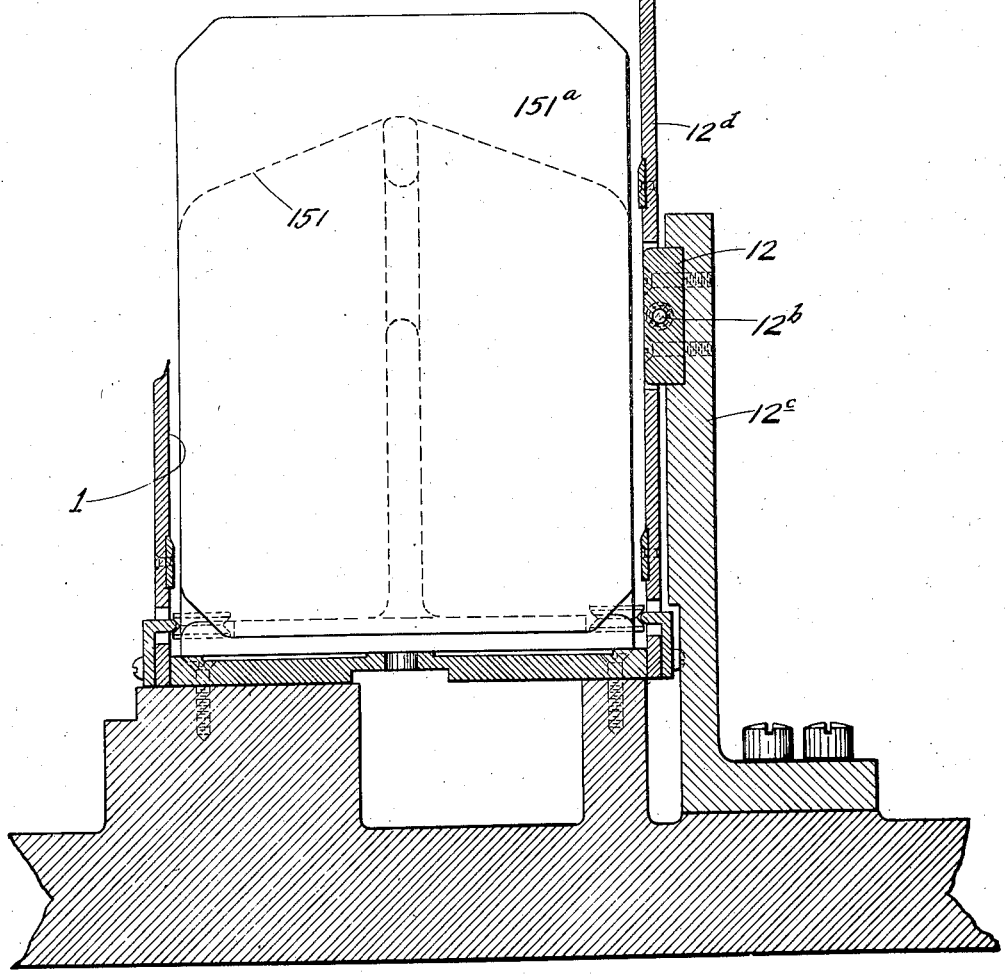

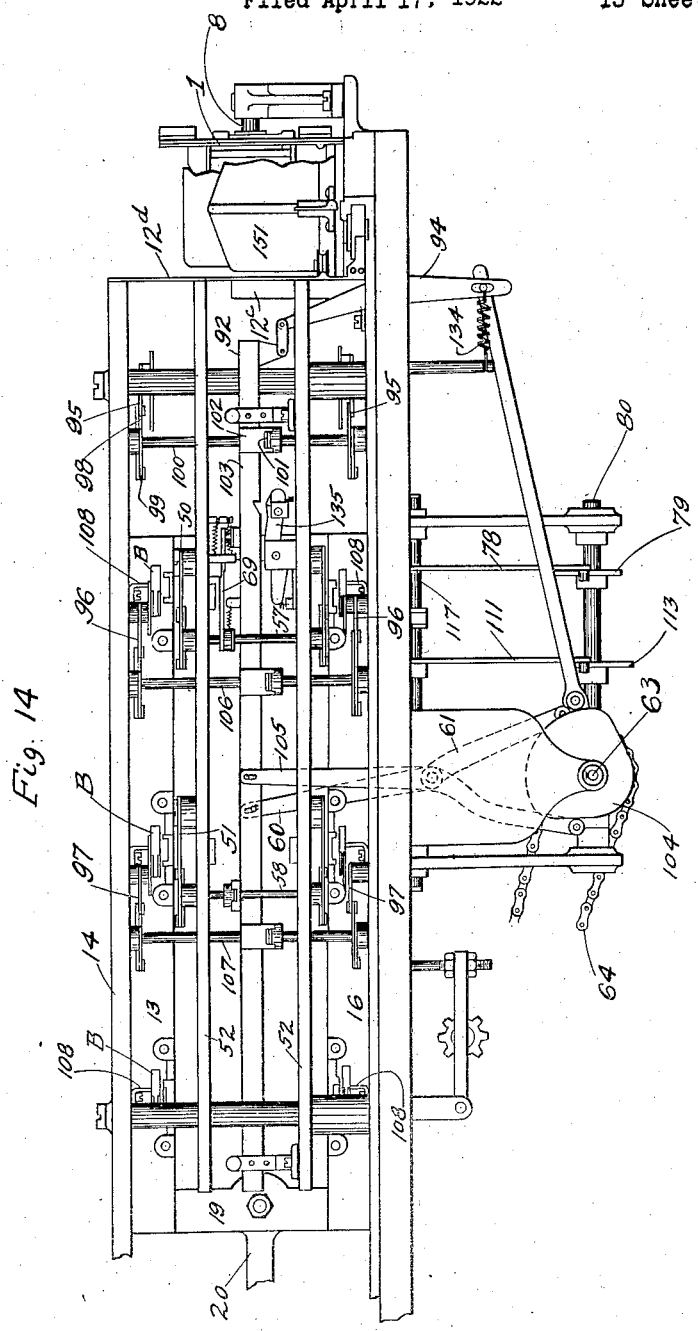

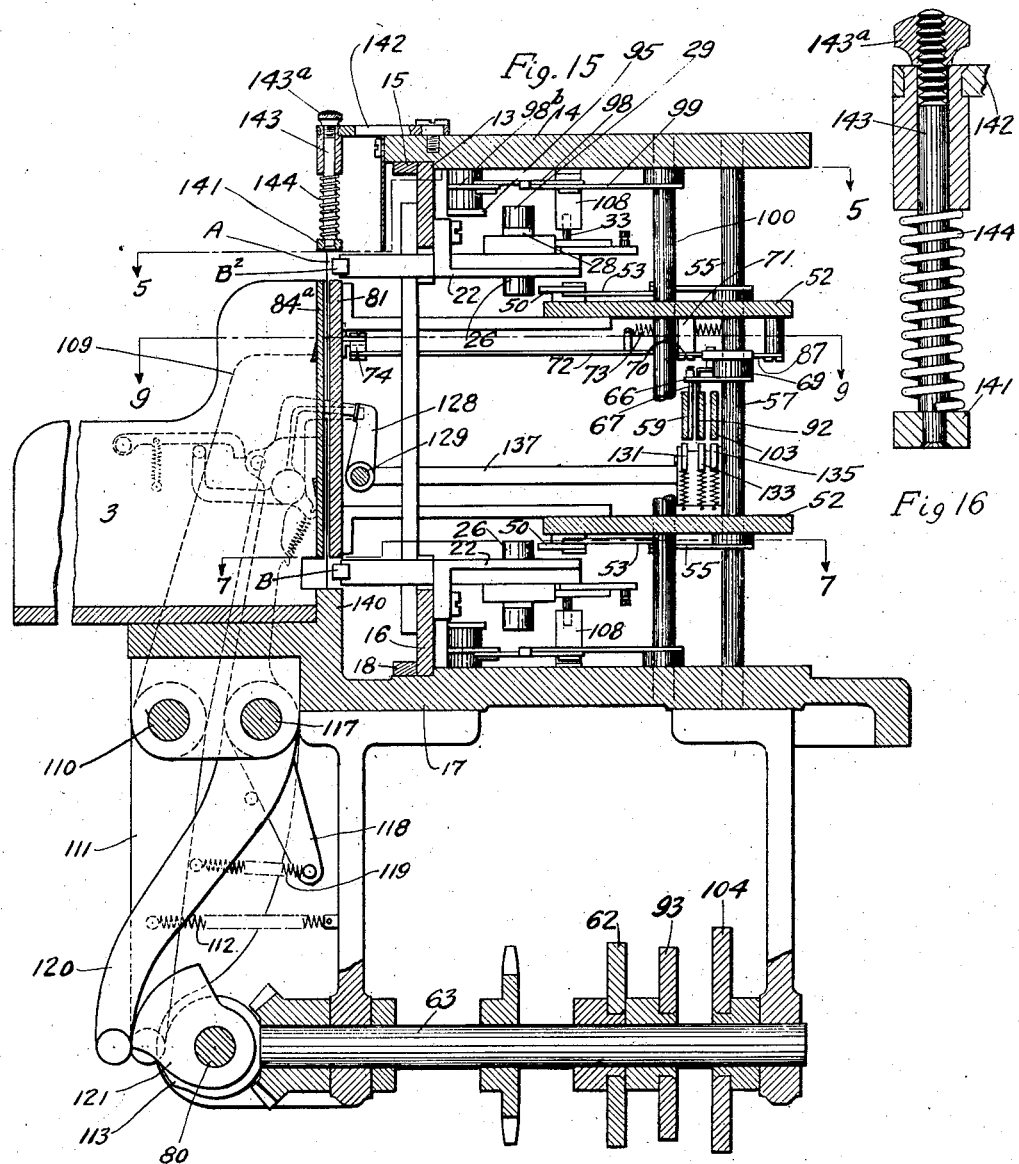

June 26, 1928.
J. R. PEIRCE
SORTING MACHINE
Filed April 17, 1922
1,674,660
13 Sheets-Sheet 10
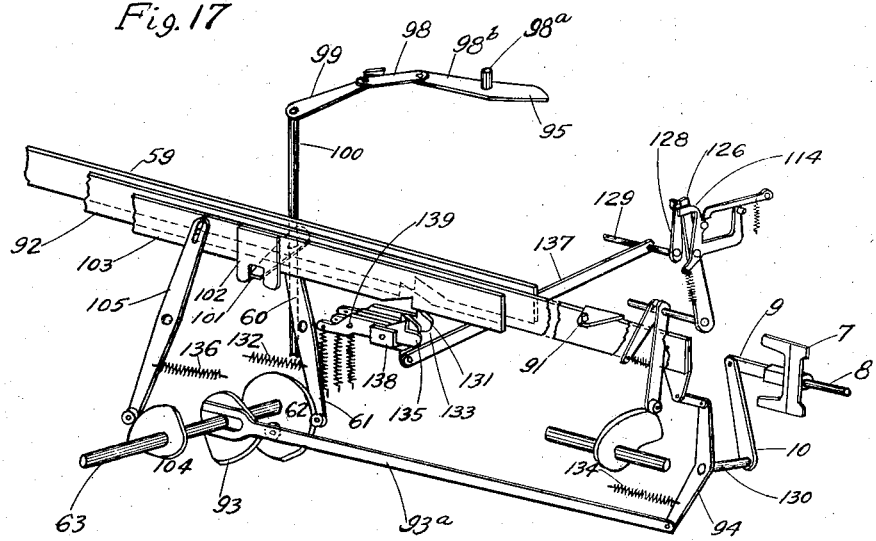
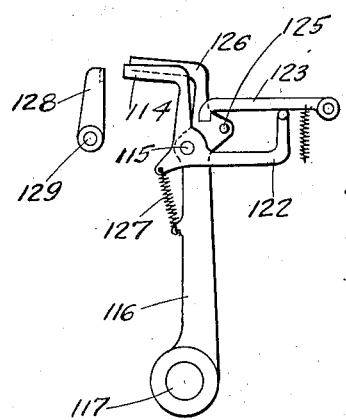
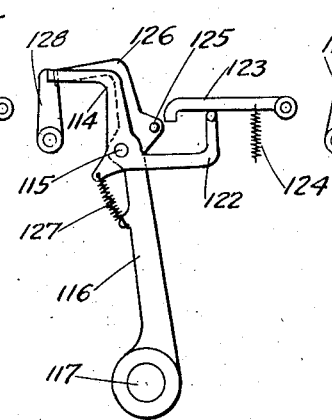
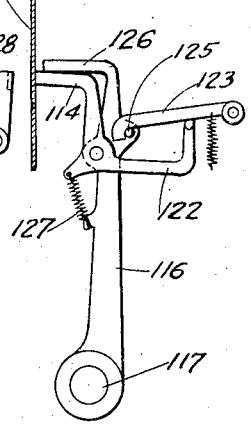
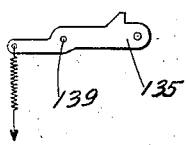
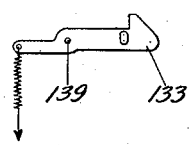
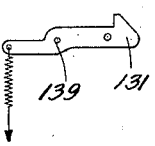
INVENTOR.
John Royden Peirce
BY
Cooper, Kerr & Dunham
ATTORNEYS.

June 26, 1928.

J. R. PEIRCE 1,674,660

SORTING MACHINE

Filed April 17, 1922   13 Sheets-Sheet 11

INVENTOR.
John Royden Peirce
BY
Cooper, Kerr + Dunham
ATTORNEYS.

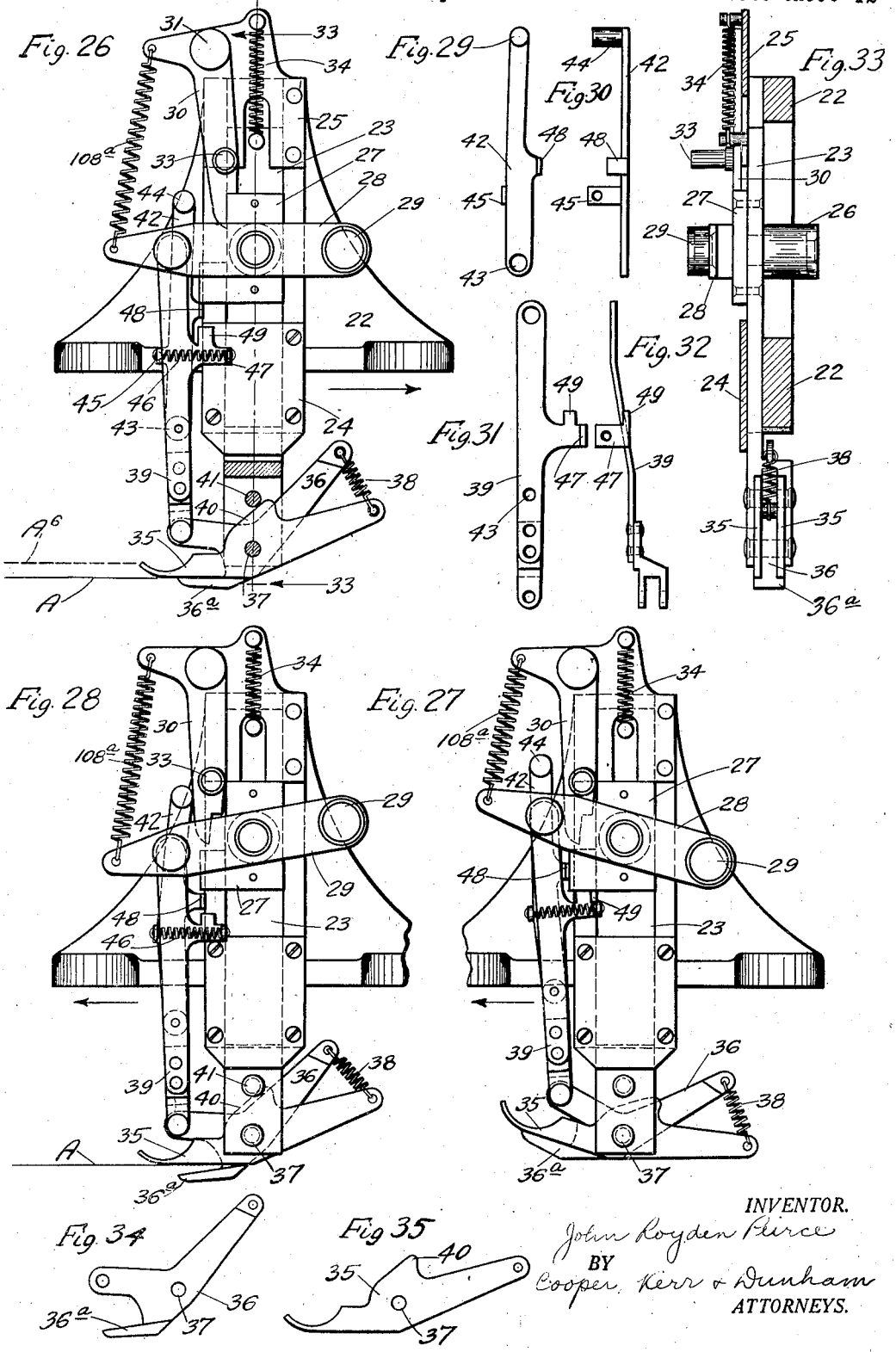

June 26, 1928.

J. R. PEIRCE 1,674,660

SORTING MACHINE

Filed April 17, 1922    13 Sheets-Sheet 13

INVENTOR.
John Royden Peirce
BY
Cooper, Kerr & Dunham
ATTORNEYS.

Patented June 26, 1928.

1,674,660

UNITED STATES PATENT OFFICE.

JOHN ROYDEN PEIRCE, OF NEW YORK, N. Y., ASSIGNOR TO INTERNATIONAL BUSINESS MACHINES CORPORATION, OF NEW YORK, N. Y., A CORPORATION OF NEW YORK.

SORTING MACHINE.

Application filed April 17, 1922. Serial No. 554,245.

In my Patent No. 1,219,767 of March 20, 1917, I have described a machine for distributing perforated cards of different classes. Each card represents an item or set of items to be accounted for, and is punched in one way or another according to the class in which it belongs. The machine is particularly adapted for cards which are punched in various combinations of perforations, but the invention is applicable also to machines which distribute cards whose classifications are indicated by the use of a single perforation in different spaces on the cards.

The present invention is directed to a machine of the same general type as in the above patent, the machine being improved in certain parts of the mechanism and particularly by the provision of means for preventing the jamming of the machine by the failure of the card to move through it in the regular way. In sorting machines, not only of the type described in the above patent, but of various other types, it happens occasionally that by reason of a bent or mutilated or otherwise imperfect card, or by reason of some defective operation of the machine, a card fails to pass through the machine properly and causes a jam which results in the destruction of one or more of the cards before the machine can be stopped. The making of new cards to replace those which are thus injured or destroyed is a difficult matter. Nevertheless it is important that the cards thus injured or destroyed be correctly replaced, otherwise the tabulating machine through which the cards are to be run after sorting will not give the correct accumulation and the entire system is rendered comparatively useless.

My non-jam mechanism applied to sorting machines for perforated cards saves this loss of time and danger of inaccuracy in the final result by detecting a card which fails to pass properly through the sorting machine and by preventing the jamming of several following cards against the defective one. Sorting machines for such cards run at the rate of a few hundred cards per minute; so that when a jam commences it is impossible to stop the machine by hand before there has been a considerable accumulation of cards at the point of destruction and a mutilation or destruction of some of such cards and, in some cases, an injury to the machine.

The detector of my invention is preferably connected to the feeding mechanism so as to merely stop further movement or feeding of cards while permitting the other parts of the machine to continue their movement. But the detector may be arranged also to stop other parts of the mechanism or to stop the movement of the entire machine. The machine is also designed to permit the removal easily of the defective card. Upon such removal the machine will function properly. The operator will then duplicate the defective card and insert the new perfect card in the magazine, whence it will be sorted in due course.

The accompanying drawings illustrate a machine embodying the invention.

Fig. 2 is an elevation of the left end;

Fig. 3 is a front elevation with the casing removed, the pin box cut away and the card stacker withdrawn from the first sorting pocket;

Fig. 4 is a plan of the central portion of Fig. 3;

Fig. 5 is a plan of the machine with the top plate cut away to show the upper line of card feeding clips on a plane of section indicated at 5—5 of Fig. 15;

Figure 24:
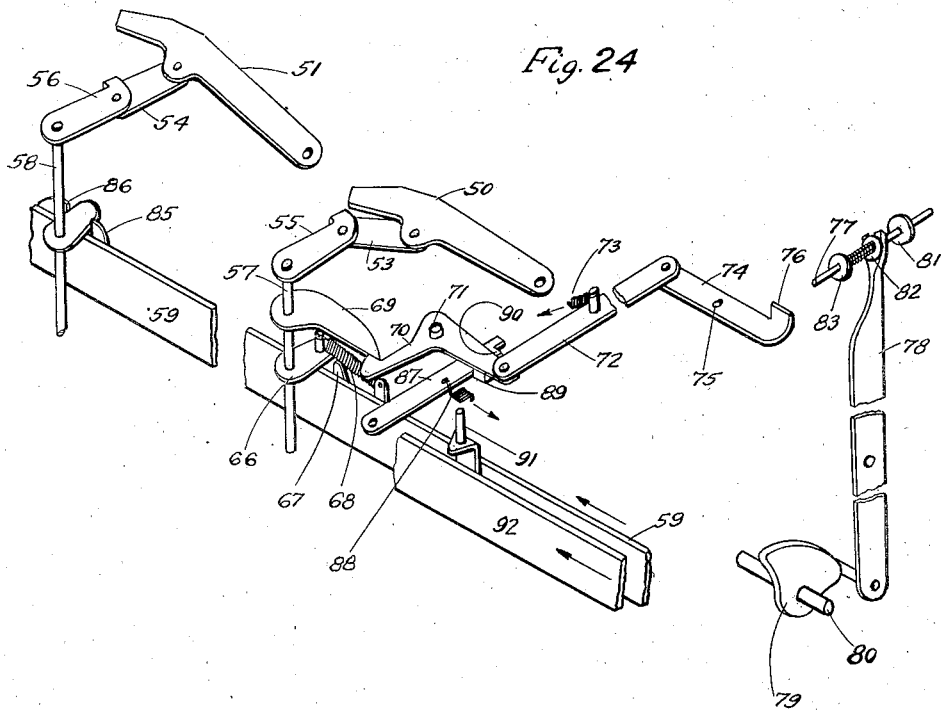
Figure 25:
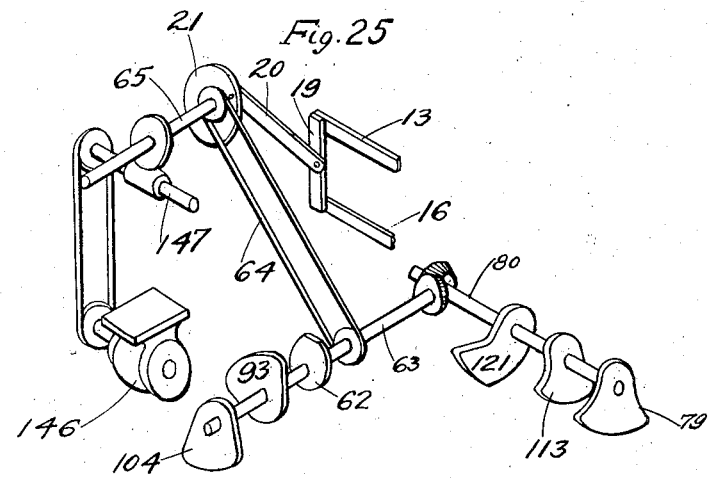
Figure 36:
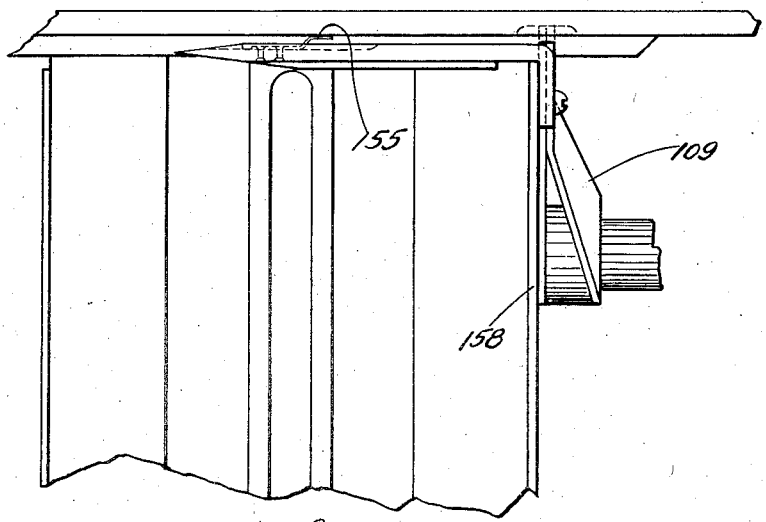
Figure 37:
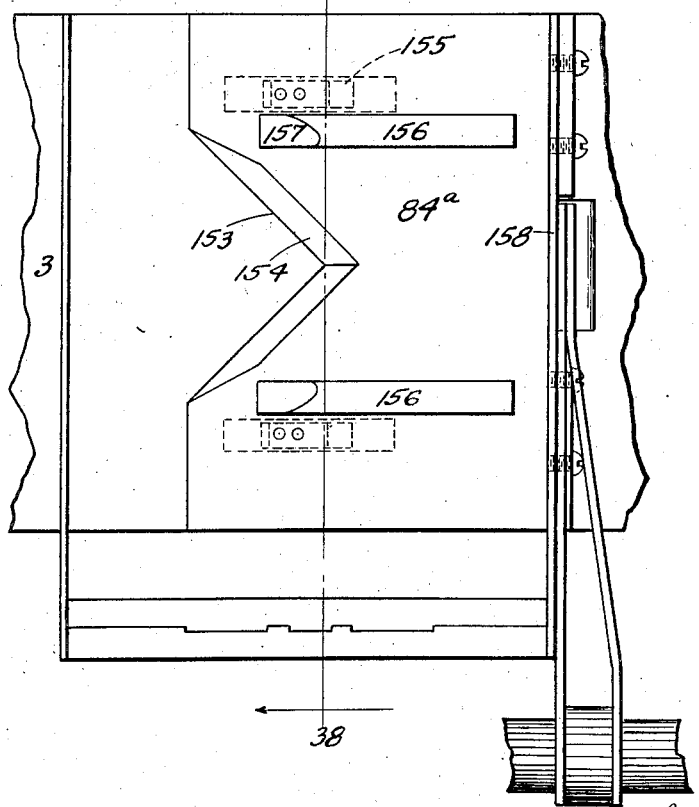
Figure 38:
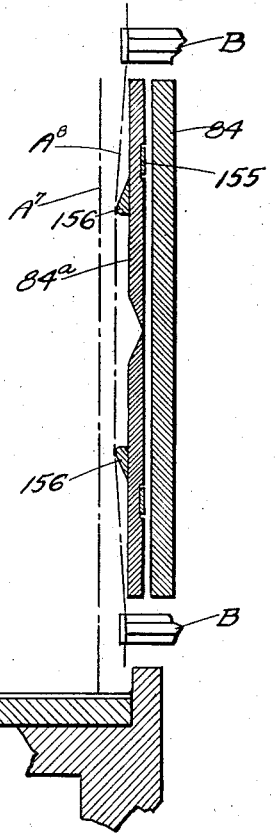

Fig. 5ª is a plan of one of these clips, and its operating mechanism;

Fig. 6 is a diagram illustrating the path of movement of the grippers;

Fig. 7 is a plan of the lower line of clips and related mechanism on a plane of section indicated at 7—7 of Fig. 15;

Fig. 8 is a diagrammatic plan view showing the successive positions of the cards;

Fig. 9 is a horizontal section approximately on the line 9—9 of Fig. 15;

Fig. 10 is a detail in plan of the mechanism shown in Fig. 9;

Fig. 11 is a detail of the magazine;

Fig. 12 is an enlarged detail of Fig. 9;

Fig. 13 is a section on the line 13—13 of Fig. 9;

Fig. 14 is a back elevation of the machine with the casing removed;

Fig. 15 is a cross-section of the machine at approximately the line 15—15 of Fig. 9;

Fig. 16 is a detail of Fig. 15;

Fig. 17 is a rear view in perspective of the detecting mechanism and related parts;

Figs. 18, 19 and 20 are elevations of a certain group of devices in Fig. 17 showing successive positions thereof;

Figs. 21, 22 and 23 are separate elevations of certain pawls shown together in Fig. 17;

Fig. 24 is a rear view in perspective of a selecting pin and clip deflecting mechanism controlled thereby;

Fig. 25 is a view in perspective of the principal shafts and cams by which the sorting of the cards and the detecting of an imperfect card are controlled;

Figs. 26, 27 and 28 are plan views of one of the clips in different positions;

Figs. 29 to 32 are separate views of levers shown in Fig. 26; Figs. 29 and 30 being respectively a plan and side elevation of one, and Figs. 31 and 32 being respectively a plan and side elevation of another;

Fig. 33 is a sectional view approximately on the line 33—33 of Fig. 26;

Figs. 34 and 35 are separate plans of the gripper jaws;

Figs. 36 to 38 are respectively a plan elevation and cross-section of a pocket.

In my previous patent the machine illustrated was adapted to sort cards in which the classification was determined by the relative arrangement of several perforations. In the embodiment of the present invention illustrated, I have shown a simpler construction of machine designed to classify cards using a single perforation to indicate their classification.

Also in the machine of the previous patent a number of sorting stations were provided and the machine was adapted, at one passage of the card through it, to sort the cards into a number of different particular classes, with a supplementary sorting pocket for cards not belonging in any one of the special classes. For the sake of simplicity, I have assumed that the present invention is applied to the sorting out of only one class of cards at a single passage of the stack of cards through the machine. In the embodiment of the invention illustrated, therefore, the machine has a single pocket for receiving cards of the desired classification, and a second pocket which receives all other cards. If there are only two classes of cards in the stack then, of course, each of the two sorting pockets will contain cards of one of these two classes. If the cards are of more than two classes then they may be run through this machine a number of times, first sorting out cards of one class, then taking all the remaining cards and sorting out therefrom cards of the second class and so on; using, of course, for the successive operations a sorting device which is adapted to classify by perforations at different points on the cards.

Figure 1:
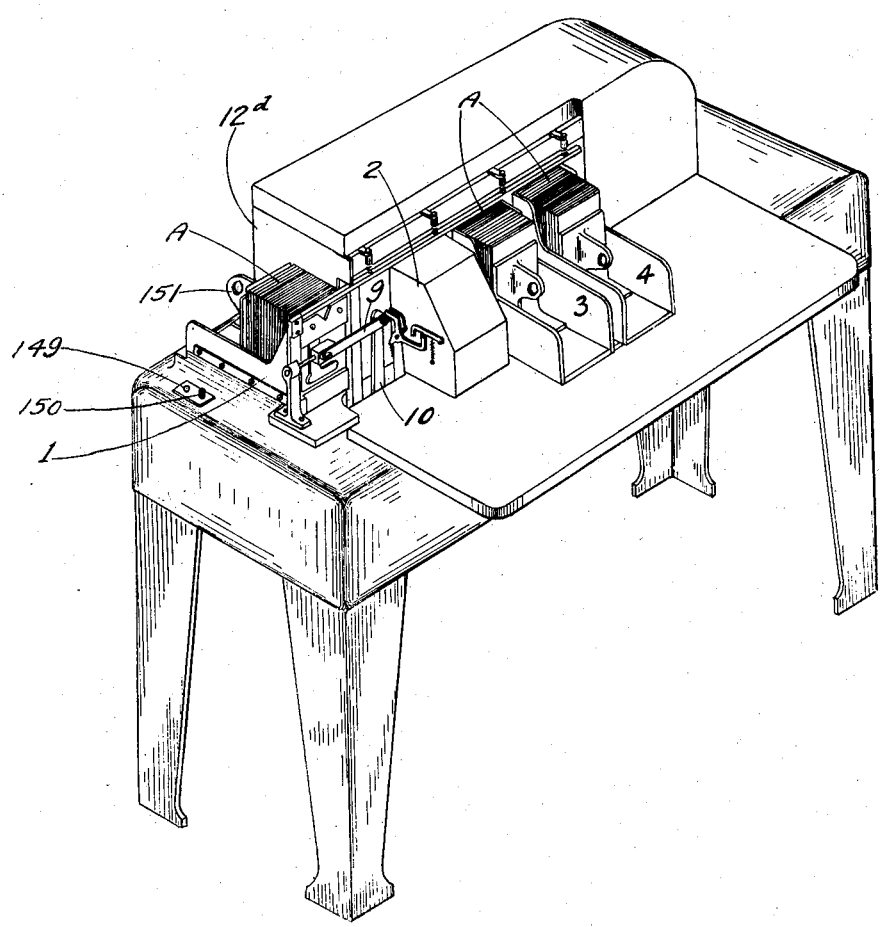
Fig. 1 is a perspective view of a complete machine, showing the front and the left hand, or magazine end.

Referring to Fig. 1, the cards A are stacked in a magazine 1 at the left of the machine and pressed forward therein. The machine is driven by a motor. The foremost cards of the stack are shifted to the right in succession which brings them into positions to register first with a pin box 2 where their classification is determined, second with a sorting pocket 3, and finally with a reserve or second sorting pocket 4. Fig. 8 illustrates the movement. The card moves first to position A'. Then it is gripped by reciprocating grippers and moved to the position A². Here a selecting pin feels for a perforation in the card. If it does not find a perforation at the proper point a second set of clips takes the card straight to the right to the position A³, and a third set of clips shifts it again to the right and it is deflected into the second pocket to the position A⁴.

If, however, while the card is in the position A² the selecting pin finds a perforation it will set the mechanism so that when the clips advance the card, they will also deflect it to the position A⁵ within the first pocket. In this way cards perforated according to the desired classification will be accumulated in the first pocket; and all other cards will pass the first pocket and be accumulated in the second.

The foremost card in the magazine 1 is given a first short movement to the right by means of a pusher 5, Figs. 9 and 12, which has a shoulder 6 of slightly less width than the thickness of a card. This pusher is mounted on the inner face of a bracket 7 which is guided on a fixed rod 8 and is reciprocated by means of a link 9 connected to a crank 10 which is continuously oscillated. In its backward position the shoulder 6 is carried to the left of the cards. Then as the pusher moves to the right the shoulder carries the foremost card with it to the desired position A', Fig. 8.

The card passes through a narrow space between a post 11 and a block 12 which is made adjustable as illustrated in Figs. 11 and 13 to the thickness of the cards to prevent the passage of the second card.

The block 12 has a flexible edge portion 12ª which is adjusted outward by means of a screw 12ᵇ; the block being fixed on a bracket 12ᶜ and passing through a slot in the inner wall 12ᵈ of the pocket.

The clips or grippers which carry the cards are illustrated in detail in Figs. 26 to 33 and their positions are shown in the elevation, Fig. 3, and in the plan view, Fig. 5. They are designated as a whole by the letter B. There are three clips at the top and three at the bottom. Those at the top are carried by a vertical plate 13 which, as shown in Fig. 15, are guided between the top plate 14 of the machine and a guide strip 15. The lower clips are mounted on a similar supporting plate 16 guided between a shoulder on the bottom 17, and a guide strip 18. The clips at the top are for engagement of the upper forward corner of a card and those at the bottom are in register therewith and operate simultaneously therewith to engage the lower forward corner of the card. The two plates 13 and 16 which carry the upper and lower sets of clips are connected at their ends, the rear end plate 19 being shown in Fig. 3 and being connected, Figs. 3 and 5, to a link 20 which is operated by a crank pin on a driving wheel 21. Thus the carriage containing the clips is continuously reciprocated. When they move to the left they will grip the forward edges of the three cards in the positions A', A², A³, Fig. 8. They will then move to the right, advancing each of these three cards one step, while a new card is pushed out of the magazine to the position A'. The cards are stopped positively in the positions A², A³ and A⁴. The grippers, which have only a frictional hold on the cards, continue to advance, thus passing beyond the forward edges of their cards. The grippers are then swung inward and moved to the left behind the several cards. Before they have moved quite back to their starting point they are swung outward and opened slightly; and at their rearward point, their jaws are brought together to grip the next series of cards; after which the movement is continued as before. Fig. 26 shows a gripper holding a card A and advancing with it in the direction of the arrow; the gripper being in the forward position, beyond the normal line of travel of the cards, which is indicated by the dotted line A⁶. That is to say, if a card is not to be pocketed it travels along the line A⁶, the gripper being in a corresponding line, and when the card is to be pocketed the gripper and card are in the lateral position indicated in full lines in this figure.

Fig. 27 shows the gripper swung behind the path of the cards and traveling backward in the direction of the arrow. Fig. 28 shows it near the end of its backward stroke with the jaws moved forward and opened ready to engage the card A.

Each clip is mounted on a bracket 22 fastened to the rear face of its carrier plate, 13 or 16. This bracket has an opening at the center as shown in Fig. 33, and (for the upper line of clips) a groove across its top face in which lies the shank 23 of the clip, held down by means of plates 24 and 25 at its front and rear ends respectively. On the underside of the shank 23 of each clip is a pin carrying a roller 26 by which the entire clip is shifted toward the front or toward the rear of the machine as hereinafter described. On the top of the shank is a plate 27 to which is pivoted a lever 28 operated through a roller 29 on one end and having at its opposite end connections which regulate the movement of the jaws.

When the shank is in the forward position of Fig. 26, it is locked by means of a spring pawl 30 pivoted at 31 and engaging the corner of the block 27. The pawl is operated, as hereinafter described, by means of a roller 33 on its top face. The shank 23 of the clip is normally drawn back by means of a spring 34.

For the lower line of clips, the parts are in vertical line with the corresponding parts for the upper line, but they are carried on the undersides of the brackets 22 (see Fig. 7) and are generally reversed top for bottom.

The jaws 35 and 36 of the clip are pivoted on the forward end of the shank at 37 and have tails which are drawn together by a spring 38 to hold the jaws normally closed. The jaw 35 consists of two plates as shown in Fig. 33, and the jaw 36 has lateral extensions 36ª at its outer end overlying the edges of the two parts of the jaw 35. The jaws are shown separately in Figs. 34 and 35. The control of their movements is effected through a link 39, Fig. 31, engaging an arm on the jaw 36. The jaw 35, however, carries a shoulder 40 which may be brought into engagement with a stop pin 41 on the shank of the gripper to limit the outward closing movement of this jaw. The link 39 at its rear end is connected to the left hand end of the lever 28. When this lever is in the intermediate position, Fig. 26, the jaws are held together by their spring and are in a normal position angularly about their pivot 37.

When the lever 28 is thrown to the position of Fig. 27, the link 39 is pulled back and the jaw 36 swung inward and, by reason of its overlap, carries the jaw 35 inward with it.

When the lever 28 is swung to the opposite extreme position, Fig. 28, the link 39 is pushed forward and pushes the jaw 37 outward. The shoulder 40, however, strikes against the pin 41 and thus limits the outward movement of the jaw 35 sufficiently to leave an opening between the two jaws.

A controlling link 42 is pivoted at 43, at its lower end, on the underside of the link 39 and has a pin 44 at its opposite end by which its position is controlled as hereinafter described. It has also a flange 45 projecting upward alongside the left hand edge of the link 39 and connected by a spring 46 with a flange 47 at the right hand edge of the link 39. The link 42 has also a shoulder 48 adapted to be engaged over the forward end of the block 27, as in Fig. 26. And the link 39 has a projection 49 adapted to be similarly engaged in the position of Fig. 27.

The controlling pins or rollers on the upper line of grippers are located on the top thereof and are actuated by cams on the underside of the top of the machine during the reciprocating motion of the grippers. Similarly the lower line of grippers have their controlling pins on their underside and are actuated by cams carried on the bottom plate of the machine.

The forward and backward movement of the shank of the gripper is effected by means of cams which act on the roller 26, to push it forward, where it is locked, and by means of the spring 34 which retracts it when it is unlocked by striking the roller 33 on the spring-locking pawl 30 so as to throw the latter to the left. The cams by which this is accomplished for the upper line of grippers are illustrated in plan at 50 and 51, Figs. 5 and 7, and in perspective view in Fig. 24. They are supported on a horizontal plate 52 below the level of the grippers, pivoted at their left hand ends and connected by toggle links 53 and 54 to arms 55 and 56 on vertical shafts 57 and 58 extending between the top and bottom walls of the machine. Running along the back of the machine at an intermediate level is, a slide or bar 59 which is reciprocated by means of a lever 60, 61, Figs. 14 and 17, bearing on a cam 62 on a cross-shaft 63 driven by a sprocket chain 64 passing over a sprocket wheel on the cross-shaft 65, Fig. 3, at the rear end of the machine.

The shaft 57, Fig. 24, has an arm 66 in the path of a projection 67 at the upper edge of the slide 59, and the arm 66 is connected by a spring 68 to a second projection on the slide. The spring tends to hold the arm 66 against the projection 67, and to cause the arm and the shaft 57 to oscillate as the slide reciprocates. When the slide 59 moves in the direction of the arrow it bends the toggle 55, 53 and withdraws the cam 50 from operation and allows the gripper to move in its normal path. When the slide 59 moves in the opposite direction it tends to turn the shaft 57 oppositely and to render the cam 50 operative to throw the gripper forward and to cause the card carried by such gripper to enter the pocket.

But the rearward movement of the slide 59 is to accomplish this purpose only in case the card is one of the selected classification. Therefore, the shaft 57 is locked to prevent such an operative movement of the cam until a card of the determined classification arrives. An arm 69 on the shaft is normally engaged by a bent pawl 70 pivoted at 71 and engaged by a link 72 which is pulled to the rear by a spring 73 and is connected at its forward end to a lever 74 pivoted at 75 and having a flange 76 which lies immediately behind the portion of the card which carries or does not carry the selecting perforation by which it is to be classified.

Registering with the same perforation space on the card is a selecting pin 77 which is engaged by the upper forked end by a lever 78, the lower end of which has a pin bearing on a cam 79 on the longitudinal cam shaft 80, Figs. 3 and 25, which is driven through bevelled gearing from the cross-shaft 63. The forked upper end of the lever 78 bears at the rear against a shoulder 81 by which the pin is retracted and at the forward side against a ring 82 which presses through an intermediate spring against a fixed shoulder 83 on the pin.

As the cam rotates the pin 77 is pressed toward and against the card. If there is no perforation in the line of movement the pin cannot pass, and is shortly withdrawn. If there is a perforation the pin 77 passes through and against the flange 76 and withdraws the locking pawl 70 and thus allows the throwing forward of the cam 50 on the backward stroke of the slide 59. Then, as the clips advance, that clip which carries the card that was in register with the selecting pin, is thrown forward by the bearing of the cam 50 on the pin 26 on the underside of the shank of the clip, and carries the forward edge of the card outward. The card then moves through the open corner of the pocket 3, as indicated in dotted lines at A Fig. 9, and thus into the sorting pocket. Where this sorting action does not take place the card is carried in its normal path between front wall 84 of the machine and the rear wall 84$^a$ of the pocket 3.

It will be understood that in passing the pin box 2 the card always passes between the front wall 84 of the machine and the rear wall 84$^b$ of this box, there being no opening for admission of the cards and being no deflection of the clips at this point.

When the card passes in its normal path back of the wall 84$^a$ of pocket 3 it is caught, at the next operation, by the third gripper. This gripper is deflected forward at each operation of the machine so that all cards taken by this gripper are deflected outward and brought by the wall 84$^c$ of pocket 4 into said pocket. To accomplish this the slide 59, Fig. 24, has a pair of fixed ears 85, 86 which rock the shaft 58 at each reciprocation and throw the cam 51 forward to operative position for each advance of the cards.

A latch 87 is provided for holding the pawl 70 out of engagement as soon as it shall have been withdrawn by the action of the selecting pin; so as to permit the latter to be withdrawn immediately to permit the free movement of the card, and to prevent the restoration of the pawl 70 as soon as the selecting pin withdraws. This latch 87, Figs. 9 and 24, is pivoted at its rear end on the underside of the plate 52, Fig. 15, and is pulled by a spring 88 against a stop 89 projecting below the end of the pawl 70. When the link 72 is pulled forward a shoulder 90 on the end of the latch 87 engages the stop 89 and thus holds the pawl 70 out of operative position. This continues until, after a sufficient forward stroke to ensure the pocketing of the card, the latch 87 is engaged by a pin 91 projecting upward from a second slide 92 which moves forward with the slide 59; being actuated by a cam 93, on the cross-shaft 63 engaging a link $93^a$ which is connected to the lower end of a lever 94 whose upper end has a linked connection with the slide 92.

The movement of the jaws of the grippers is effected by means of cams 95, 96 and 97 (Figs 5 and $5^a$ for the upper line and Fig. 15 for the lower line) pivoted on the top and bottom plates 14 and 17 of the machine so that they overlie the grippers. One of these cams is shown in Fig. 17, and is mounted on the end of a short shaft $98^a$ and has an arm $98^b$ which is connected by a toggle link 98 with an arm 99 on the end of a vertical shaft 100 which is pivotally mounted in the top and bottom plates of the machine (Fig. 15), and which carries at an intermediate point in its length an arm 101 engaged by a forked plate 102 carried by a slide 103 which is reciprocated by means of a cam 104, Fig. 17, engaging the lower end of a lever 105, the upper end of which has a pin and slot connection with the slide. Figs. 9 and 14 show the positions of the shaft 100 and the two similar shafts 106 and 107 by which the three cams 95, 96 and 97 are actuated; each of these shafts having an arm which is similarly engaged and rocked by means of forks on the one slide 103. The three cams 96, therefore, operate in the same way and at the same time.

Near the end of the feeding movement of the grippers the pins 33 thereof strike projections 108 (Figs. 14 and 15 and, in plan, Fig. 5) depending from the top wall and standing up from the bottom wall of the machine and this unlatches the shanks of any which may have been latched and allows them all to take their backward position for the return movement.

In the most advanced position of the clips, Fig. 5, the cams 50 and 51 above referred to, and which we may call "sorting cams", are in their backward inoperative position, and the grippers may take their return movement to the left without effect from these cams. The pins 29 by which the grippers are controlled on their return movement do not come into position for engagement with the cams, 95, 96, and 97 until near the end of such return movement. The movements of the grippers are illustrated in the diagram, Fig. 6. The cards are shown in the successive positions, A', $A^2$, $A^3$ and $A^4$. Only the right hand gripper of the three is illustrated. The forward or feeding movement of the first gripper at the left takes the card from position A' to $A^2$ and has no lateral movement; the second gripper takes the next card from position $A^2$ to $A^3$ normally, or if the card is to be sorted, is pushed forward as above explained; and the third gripper always carries the card from position $A^3$ to $A^4$, with a forward movement to carry it into the pocket. The cards are stopped in these positions by means hereinafter described and the grippers continue to move until they have passed slightly to the right of the edges of the cards a distance indicated by the gripper marked B' in Fig. 6. In this position the shank of the gripper has been released so that it moves to its rearward line of travel. Also the jaws have been swung inward to the position of Fig. 27 by means of the spring $108^a$ and the forward face of the grippers lies just to the rear of the normal path of the cards indicated by a dotted line in Fig. 6. This, therefore, may be called the starting position of the grippers. As they move to the left they retain this position until they arrive at about the point $B^2$. At this point the jaw-operating cams 95, 96 and 97 engage the rolls 29 on the levers 28 and by pushing down the links 39 swing the jaws outward and open them as in Fig. 28, this position being shown at $B^3$, Fig. 6. A slight further movement to the left takes place, whereupon the rollers on the grippers pass beyond the cams and the spring $108^a$ again closes the jaws so that they grip the cards as at $B^4$, Fig. 6. The feeding movement then begins and proceeds as above described.

Referring now to Figs. 26, 27 and 28, when the grippers were opened, as in Fig. 28, the projection 48 on the link 42 was pulled inward by the spring 46 and brought into the path of the block 27. Then when, by a selecting operation, the shank 23 and the block 27 are pushed forward as in Fig. 26, the engagement of the block with the projection 48 prevents the spring $108^a$ from acting to swing the gripper jaws inward, and thus these jaws are held in a position to grip the card in a line parallel with its intended travel.

At the right hand end of the travel of the grippers, when the shank and the block 27 have been retracted by the spring 34 by throwing to the left the locking pawl 30, the pin 44 on the end of the link 42 has been engaged by the end of the pawl 30 so as to press the projection 48 to the left and allow it to pass up alongside the block 27, as shown in Fig. 27. However, the action of the spring $108^a$ is limited by the striking of the projection 49 on the link 39 against the underside of the block.

The cam 97 is shown in dotted lines in Fig. $5^a$ in position to engage the roller 29 with the gripper indicated in the position of B² of Fig. 6. The further movement of the gripper from this position results, first in the opening of the jaws and, as the roller rides over the end of the cam, in the closing of them on the edge of the card.

The above description has applied particularly to the upper line of grippers, those of the lower line and the cams and controlling mechanism therefor, are in register vertically with the corresponding parts in the upper line so that these grippers engage the lower forward corners of the cards as the upper line grip the upper forward corners.

The cards, travelling along their normal path, are stopped in the positions A² and A³ by means of arms 109, Figs. 3, 9 and 15, located against the right hand faces of the pockets and swinging into the position of Fig. 9 so as to close the end of the space between the front wall 81 of the machine and the rear walls of these pockets. These stop arms are mounted on a shaft 110 which has a depending arm 111 pulled inwardly by means of a spring 112 so as to hold a roller on its lower end in engagement with a cam 113 on the longitudinal shaft 80. The spring 112 holds the stop arms outward to permit the passage of the cards, and the cam moves them inward just before the arrival of the next card and holds them inward until the grippers have continued beyond the edges of the card.

If for any reason the cards do not feed properly forward so as to bring them properly against the stops 109 or fully into the reserve pocket 4, a continued feeding of the cards will cause them to jam. I have, therefore, provided a detecting mechanism for ascertaining at each operation that the cards have been carried to their proper stations; and for preventing a jam in case a card has not moved properly.

For this purpose there is provided a detector on the left hand face of the pin box 2 and each of the pockets 3 and 4. This detector comprises an arm 114 arranged to swing across the normal path of the cards at a point immediately in the rear of the rear edges of the latter if they have taken their proper stations; or to strike the cards if they have not moved sufficiently forward. This detector arm 114 is shown in three positions in Figs. 18, 19 and 20. They are pivoted at 115 on arms 116 carried on a shaft 117, Fig. 15, which has a lower arm 118 fixed thereon and connected by a spring 119 with a long arm 120 which is loose on the same shaft and which has at its lower end a roller riding on a cam 121 on the longitudinal shaft 80. As the projection on the cam 80 engages the lower end of the arm 120 it throws the latter out. The arm 120 tends to pull the arm 119 through the spring connection 118, and to turn the shaft 117 so as to advance the several arms 116 and the detectors carried therewith.

The detector 114 has a tail 122 the upper end of which is bent and bears under a latch 123 pivoted at its rear end and pulled down by a spring 124, the end of the latch comprising a hook which is adapted under proper circumstances to drop over a pin 125 on the arm 116. The upper end of the arm 116 lies adjacent to the detector 114 and constitutes a pusher 126 for actuating the controlling mechanism hereinafter described.

The retracted positions of the parts are shown in Fig. 18. At the end of a feeding operation the arm 116 is pressed forward with a spring pressure as above described. The spring 127 holds up the tail 122 of the detector and holds up the latch 123. If there is no obstruction, the parts move forward uninterrupted, to the position of Fig. 19. The pusher 126 passes through an opening in the front wall 81 of the machine, as in Figs. 8 and 10, and strikes one of the arms 128 on a shaft 129 and bears against it with sufficient force to rock the shaft. There are three arms 128 on the same shaft registering with the three arms 116, as shown in Fig. 9.

If instead of moving forward uninterruptedly the detector 114 should strike a card A which had not advanced properly, the detector would swing back around its pivot and lower its tail 122, which would permit the latch 123 to drop over the pin 125 and prevent further movement of the arm 116, Fig. 20. The stoppage of one of these arms prevents the movement of the shaft 117 and thus stops them all. An improper position of any one of the cards, therefore, will prevent the striking of any of the arms 128 and the turning of the shaft 129. This shaft controls the feed of the cards in the manner shown in Fig. 17.

The three slides 59, 92 and 103 are actuated by cams in one direction and by springs in the opposite direction. These slides control the gripping and the selecting movement of the grippers as the latter are reciprocated by the motor. The middle slide 92 is actuated, as before explained, through a lever 94. The pivot or shaft 130 of this lever carries at its forward end the arm 10 by which the pusher 7 is reciprocated in order to push the foremost card out of the magazine. If the motion of these slides be stopped, therefore, there will be no further feeding of a card out of the magazine and the grippers will move back and forth idly along their rearward path with the parts thereof in the position of Fig. 5, the controlling cams being in the inoperative positions.

The slide 59 has a notch on its underside for engagement in its advanced position, as in Fig. 17, with a spring pawl 131, Fig. 23.

If the pawl is held out of operation then as the operating cam 62 turns further the spring 132 will cause the slide to move backward to the right, Fig. 17. If the pawl springs into its notch in the slide, however, the spring 132 will not be able to shift the slide and the latter will be held in its advanced position.

Similarly the slide 92 has a notch in position to be engaged by a spring pawl 133, Fig. 22, when the slide is in the advanced position illustrated. As the cam 93 which actuates this slide to the left turns further, the spring 134 engaging the lever 94, will shift the slide back to the right. If the slide is caught by its pawl, however, the spring cannot act and the slide will be held by the pawl in its advanced position.

The slide 103 advances to the right rendering its clip-actuating cam inoperative by such advance. It is provided with a notch in register with a pawl 135 (Fig. 21) working in the reverse direction from the pawls 131 and 133. This slide is advanced by the cam 104 and retracted by the spring 136, if the pawl be held out of operation. If the pawl be free, however, it will spring into engagement in the forward position of the slide and hold it against the pull of the spring 136 and will thus prevent the rendering of the cam 95 operative.

The detector operates on the pawls 131, 133 and 135 through an arm 137 fixed on the shaft 129, the rear end of this arm being connected to a bracket 138 which is pivotally connected to the several cams all of which are mounted on a pivot pin 139. At each operation of the machine the detectors feel for a card in wrong position and, failing to find one there, permit the advance of the pusher 126 and the rocking of the shaft 129 and the withdrawing of the several pawls, thus permitting the machine to function in the regular way. If, however, any one of the detectors 114 finds a card in wrong position, its arm 116 and the several pushers 126 will be locked so that they cannot rock the shaft 129. At the end of the advance of the several gripper-controlling slides, the latter will be locked so as to stop the pusher 7 and to render inoperative the cams which ordinarily cause the grippers to take hold of and feed the cards. The cards will, therefore, stand still while the running gear of the machine will continue in operation.

The detector or equivalent controlling mechanism may be used in various other ways to prevent jamming in case of a defective card or an improper feed. For example, it may effect a stoppage of the entire machine or of any parts thereof which will prevent a jam and will permit a correction of the trouble.

There is a variety of machines controlled by cards not only for sorting the cards but for performing various other accounting operations, in which the cards or a number of them are automatically fed in succession to a particular station or stations, and my invention is applicable not only to sorting machines but to most or all card control machines which feed the cards as described.

When the error occurs and the feed stops, as described, the operator can see the cards and can see which one has failed to feed properly. On withdrawing this card the detector control will immediately render the slides and cams and grippers again operative and the machine will proceed with only sufficient delay to permit the withdrawal of the defective card. A duplicate of the defective card will be made and inserted in the magazine. The machine is designed to facilitate observation of the cards and easy withdrawal of the one which fails to feed properly.

Fig. 3 shows in dotted lines at $A^6$, a card which has failed to travel sufficiently to the right. The lower edge of the card rests on a part 140, Fig. 15, of the front wall of the machine and its upper edge is held lightly by a bar 141 to prevent accidental vertical movement. The upper part of the card projects above the walls of the pin box and pockets and above the front wall 81 of the machine, the grippers traveling at the level shown at B, Fig. 15. There is a space between each two grippers. The upper part of the card is, therefore, visible at all times and is easily taken hold of by the operator's fingers except for the guiding bar 141.

The guide bar is easily moved to a position where it will not interfere with such removal of a card or cards. For this purpose it is suspended, Figs. 3, 4 and 15, from arms 142 pivotally mounted at their rear ends on the top plate 14 of the machine. Pins 143 pass freely through the outer ends of these arms and are fastened at their lower ends to the bar 141, being pressed down lightly in engagement with the cards by means of springs 144 and being limited in their movement by heads $143^a$ in the form of adjustable nuts. When a stoppage occurs the operator has only to take hold of the head of one of the pins 143, lift it slightly and swing it to the right, which will shift the bar 141 to the position shown in dotted lines in Fig. 4. This exposes the cards and permits the operator to take hold and lift them upward out of the machine. When the machine is started again the bar is swung back into position, being stopped in its movement to the left by means of a projecting plate 145, Figs. 3 and 4, on the left hand end of the frame.

The machine may be driven by a motor 146, Fig. 3, which is connected by a belt to a shaft 147, on the end of which is a hand wheel 148 which may be used to turn the machine by hand when the motor is disconnected. Fig. 1 shows buttons 149 and 150 for starting and stopping the motor.

In introducing cards into the magazine the stacking plate 151, Fig. 2, is drawn back by hand against the usual spring or weight (not shown) and is caught by a spring pawl 152. When the desired number of cards are introduced into the magazine, the tail of the pawl is pressed down and the plate 151 will move up against the cards and press them forward as they are removed at the front end.

Figs. 36, 37 and 38 indicate features of the sorting and reserve pockets which contribute to reliability and quickness of operation. Pocket 3 has its inner wall 84 cut away to form a recess 153 on the rear edge, with bevelled face 154. As a card is drawn over this edge of the wall by the clips and is thereby deflected into the pocket, it will be remembered that it is held only at the upper and lower corners by the clips. The center of the forward edge of the card being free to bend it is not so accurately directed by the clips, and the provision of a recess in this edge of the deflecting wall 84 avoids the obstructing of the cards if they bend slightly at the center. Set in longitudinal recesses on the rear face of the wall 84 are light springs 155 which bear against a card passing between such wall and the wall 84 of the machine and form an impositive lock to prevent the card from jumping when it strikes one of the stops 109 and is stripped out of the grippers.

It is understood that when a card is introduced into a pocket there is already a stack of cards therein held by the usual sliding weight pressing against the outer one. The new card, therefore, has to be forced between the last previous card and the deflector or back 84 of the pocket. To permit the easier introduction of the card into this space I provide means whereby each card as it is introduced between the previous card and the deflecting plate is given a slight additional push outward; so that the next card may enter with comparative ease. For this purpose I provide guides or deflectors consisting of ribs 156 with their rear ends 157 bevelled, the ribs being of such thickness as to deflect the central portion of the card outward beyond the path of the ends. In Fig. 28 I show the last previous card introduced at $A^7$ and the new card at $A^8$. As the latter enters the pocket its center is deflected by the ribs 156 so as to bend it slightly. When it strikes the right hand wall 158 of the pocket and is stripped from the grippers its upper and lower edges are released and it tends to spring straight with a movement which presses it outward against the previous card $A^7$. It will then be loose in its position instead of being packed closely against the wall $84^a$ of the pocket, and the entry of the next card will be made easier so that there is no danger of the latter being released by the grippers before it has fully entered the pocket. By this means the machine may be set to work at a comparatively high speed.

Though I have described with great particularity of detail a specific embodiment of my invention, yet it is not to be understood therefrom that the invention is restricted to the particular embodiment disclosed. Various modifications in detail and in the arrangement of the parts may be made by those skilled in the art and the detecting mechanism may be used with various other controlling devices, automatic or manual, for stopping the feed or other part of the machine, without departing from the invention as defined in the following claims.

What I claim is:

1. A machine of the class described including in combination means for feeding cards and means at the rear of the normal position of a card operative upon sensing a card for preventing the jamming of the machine when a card fails to move to such normal position.

2. A machine of the class described including in combination means for feeding cards and means for interrupting the feeding operation when a card fails to feed properly for suspending the operation until the card is removed and for automatically resuming operation on removal of the card.

3. A machine of the class described including in combination means for feeding cards and a detector for ascertaining that a card has moved to the proper station and means controlled by said detector for stopping the feeding of cards in case a card has not moved to the proper station and for suspending the operation until the card is removed.

4. A machine of the class described including in combination means for feeding cards and a detector arranged to move across the path of a card immediately behind its rear edge when in its proper station or to strike the card if it has not moved sufficiently forward.

5. A machine of the class described including in combination means for feeding cards and a detector for ascertaining that a card has moved to the proper station and a member adapted by its normal movement to control the operation of the machine, the normal movement of said member being prevented by the detector when a card has not moved to the proper station out of the path of the detector.

6. A machine of the class described including in combination means for feeding cards and a detector for ascertaining that a card has moved to the proper station and a member adapted by its normal movement to control the operation of the machine, and a latch for preventing such normal movement, said latch being operated by the detector when a card has not moved to its proper station out of the path of the detector.

7. A machine of the class described including in combination means for feeding a card to successive stations and means for feeding a card in an improper position at any one of said stations for preventing jamming of the machine.

8. A machine of the class described including in combination means for feeding a card, controlling cams, pawl mechanism for holding said cams inoperative and thus preventing a feeding operation, and a detector adapted under normal operation to render the pawl mechanism inoperative and thus to permit a feeding operation, and under abnormal operation to permit said pawl mechanism to operate.

9. A machine of the class described including in combination means for feeding a card, a controlling cam, a reciprocable member connected to said cam, a pawl adapted to engage and hold said member in position to hold the cam inoperative and means controlled by a card when in normal position to hold said pawl out of action.

10. In a perforated-card-controlled machine, means for feeding cards through the machine, said cards being at all times readily accessible for removal manually, and means controllable by a card improperly positioned, for controlling the machine.

11. A machine of the class described including in combination means for feeding cards and means for interrupting the operation when a card fails to feed properly and for automatically resuming operation on removal of the card, said card being exposed so as to be readily observable and removable in case of such failure.

12. A machine of the class described including in combination means for feeding a succession of cards, and guides engaging the edges of the cards, one of said guides being held in place by a light spring and adapted to be withdrawn and shifted laterally out of the plane of the cards to permit the withdrawal of the latter.

13. A machine of the class described including in combination means for advancing cards and deflecting means comprising a plate over the forward edge of which the card is passed in a deflecting operation, said edge having a retracted intermediate portion so that the intermediate portion of the card will be the last to engage the plate.

14. A machine of the class described including in combination means for advancing cards and deflecting means comprising a plate over which the card is passed in a deflecting operation, said plate being shaped and arranged so as to engage the edge of the card progressively at different points.

15. A machine of the class described including in combination means for advancing cards and introducing them in succession at one end of a stack and means for giving to a card when it is introduced a slight lateral movement toward the other end of the stack.

16. A machine of the class described including in combination means for advancing cards and introducing them in succession at the rear of a stack, said means including grippers engaging the opposite ends of the front edge of a card, and deflecting means adapted to hold the center out of line with the ends so as to cause the card to spring out when released from the grippers.

17. In a perforated-card-controlled machine, a supply station, a plurality of receiving stations, means for feeding cards from the supply station to the receiving stations, and means operative when a card is misfed for controlling said feeding means, said feeding means being adapted to present a misfed card for ready removal from the machine.

18. In a machine of the class described, means for feeding cards successively to a plurality of stopping positions, means adapted to project into the path previously traversed by a card after it has reached one of said stopping positions and means for stopping the feeding of cards when said projecting means engages a card.

In testimony whereof I hereto affix my signature.

JOHN ROYDEN PEIRCE.